United States Patent [19]
Manecke

[11] 3,870,229
[45] Mar. 11, 1975

[54] THERMOSTAT CONSTRUCTION AND ELECTRICAL CONTROL SYSTEM UTILIZING THE SAME

[75] Inventor: Siegfried E. Manecke, Indiana, Pa.

[73] Assignee: Robertshaw Controls Company, Richmond, Va.

[22] Filed: Jan. 4, 1974

[21] Appl. No.: 430,893

Related U.S. Application Data

[63] Continuation of Ser. No. 260,107, June 6, 1972, abandoned.

[52] U.S. Cl. ........................ 337/57, 337/82, 337/94, 337/342, 337/347, 337/360, 337/368
[51] Int. Cl. ........................................... H01h 71/16
[58] Field of Search ............ 337/52, 57, 82, 93, 94, 337/342, 347, 349, 360, 368

[56] References Cited
UNITED STATES PATENTS
2,239,540   4/1941   Spencer ............................. 337/347
3,226,511  12/1965   Mertler ........................... 337/347 X
3,573,700   4/1971   Schmitt ............................. 337/347

Primary Examiner—Donovan F. Duggan
Assistant Examiner—Fred E. Bell
Attorney, Agent, or Firm—Candor, Candor & Tassone

[57] ABSTRACT

A thermostat construction having a fixed contact and a blade-carried movable contact operated by a bimetallic snap disc together with temperature setting means for selecting the temperature of operation that the disc will snap and move the movable contact out of contact with the fixed contact, the temperature setting means comprising a plunger passing through an opening provided through the blade and centrally engaging the snap disc, a spring operatively associated with the plunger to urge the plunger into engagement with the snap disc, and an adjustor for adjusting the force of the spring that urges the plunger into engagement with the snap disc.

22 Claims, 6 Drawing Figures

3,870,229

THERMOSTAT CONSTRUCTION AND ELECTRICAL CONTROL SYSTEM UTILIZING THE SAME

This is a continuation of application Ser. No. 260,107, filed June 6, 1972, now abandoned.

This invention relates to an improved thermostat construction as well as to an electrical control system utilizing such thermostat construction.

It is well known that bimetallic snap discs can be utilized for controlling an electrical switch to open the electrical switch when the bimetallic disc senses a certain temperature.

It is also well known that in such a bimetallic snap disc thermostat construction, temperature setting means can be provided for varying a spring force being imposed upon the snap disc to change and thereby select the sensed temperature that will cause the bimetallic snap disc to snap and thereby open or close the electrical switch structure in connection therewith as the case may be.

For example, reference is made to the U.S. Pat. to Spencer, No. 2,239,540, wherein such bimetallic snap disc thermostat construction is provided and utilizes a temperature adjusting means of the above-described arrangement.

However, it has been found according to the teachings of this invention, that an improved temperature setting means can be provided for such a bimetallic snap disc thermostat construction.

In particular, one feature of this invention is to provide an improved temperature setting means for a bimetallic snap disc thermostat construction wherein accurate alignment of the temperature setting parts is maintained with certain of the parts thereof still performing the function of moving the movable contact relative to the fixed contact upon snapping movement of the snap disc.

For example, one embodiment of this invention provides such a temperature setting means for a thermostat construction that has a fixed contact and a blade-carried movable contact supported by a frame means. A bimetallic snap disc is carried by the frame means for controlling movement of the movable contact relative to the fixed contact in response to snapping temperature sensing conditions of the disc. The temperature setting means is carried by the frame means and is utilized for selecting the temperature of operation of the snap disc for moving the movable contact out of contact with the fixed contact. The temperature setting means comprises a plunger means passing through opening means provided through the movable blade and engaging the central portion of the snap disc. Spring means is carried by the frame means and is operatively associated with the plunger means to continuously urge the plunger means into engagement with the snap disc. Adjusting means are provided for adjusting the force of the spring means that urges the plunger means into engagement with the snap disc to thereby select the snapping temperature for the snap disc.

Accordingly, it is an object of this invention to provide an improved thermostat construction having one or more of the novel features set forth above or hereinafter shown or described.

Another object of this invention is to provide an electrical control system utilizing such a thermostat construction.

Other objects, uses, and advantages of this invention are apparent from a reading of this description which proceeds with reference to the accompanying drawings forming a part thereof and wherein.

Figure 1:
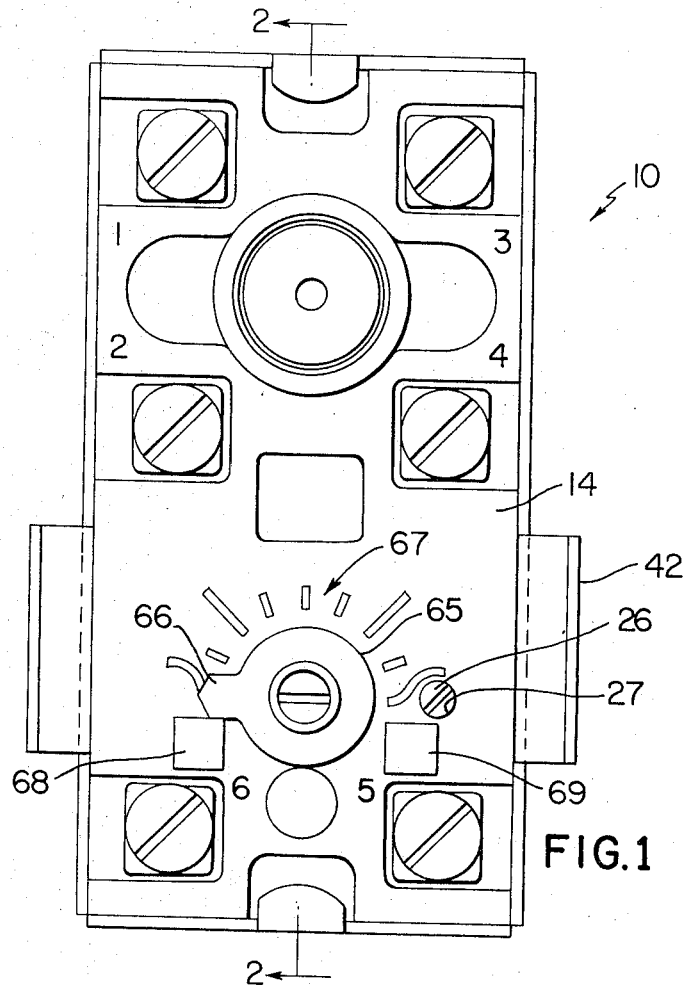
FIG. 1 is a front view of the improved thermostat construction of this invention.
Figure 2:
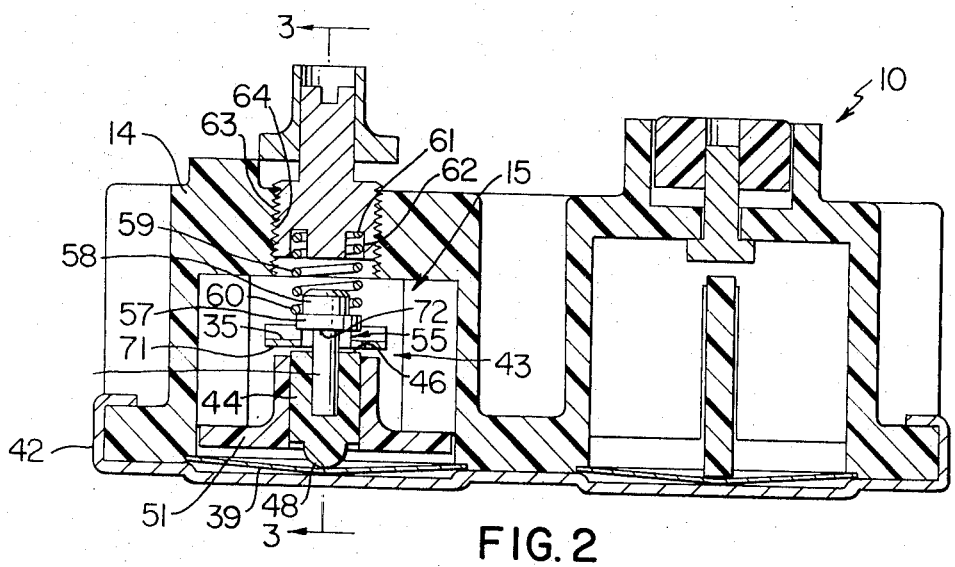
FIG. 2 is a cross-sectional view taken on line 2—2 of FIG. 1.

While the various features of this invention are hereinafter described and illustrated as providing a thermostat construction for a particular electrical control system, it is to be understood that the thermostat construction of this invention can be utilized with other electrical control systems as desired.

Therefore, this invention is not to be limited to only the embodiment illustrated in the drawings, because the drawings are merely utilized to illustrate one of the wide variety of uses of this invention.

Figure 3:
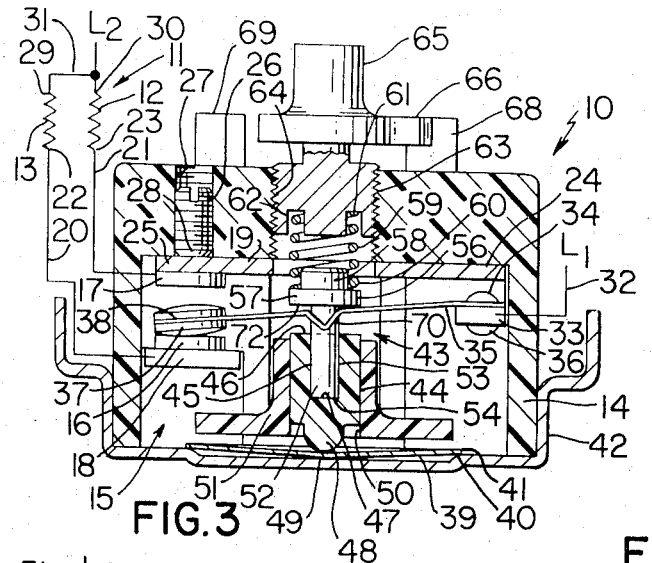
FIG. 3 is a cross-sectional view taken on line 3—3 of FIG. 2 and schematically illustrating the electrical control system utilizing the thermostat construction.
Figure 4:
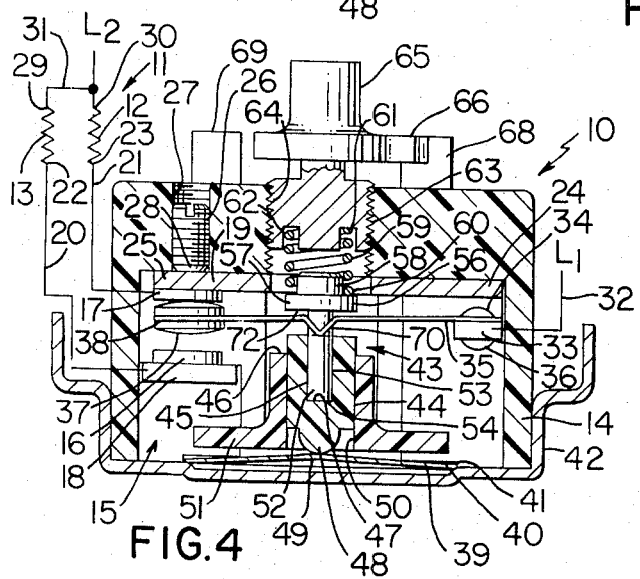
FIG. 4 is a view similar to FIG. 3 and illustrates the snap disc in a different snapped condition thereof.
Figure 5:
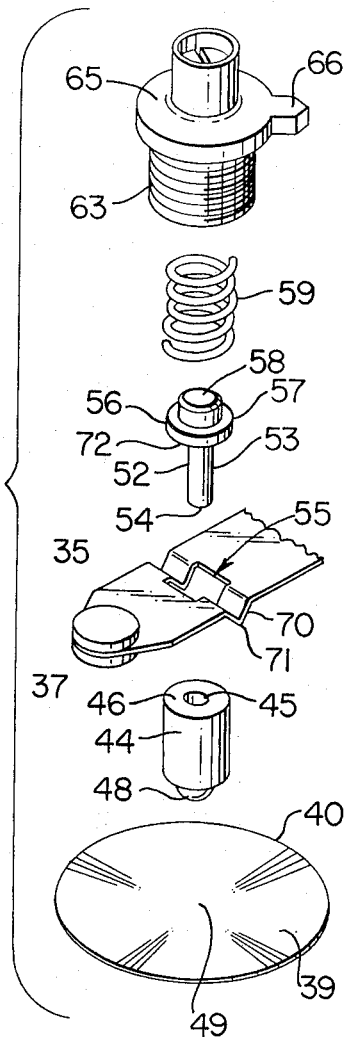
FIG. 5 is an exploded perspective view of certain parts of the temperature setting means of the thermostat construction of this invention.

Referring now to FIGS. 1–5, the improved thermostat construction of this invention is generally indicated by the reference numeral 10 and is illustrated schematically in FIGS. 3 and 4 as being utilized in an electrical control system that is generally indicated by the reference numeral 11, the electrical control system 11 comprising a pair of power source leads L1 and L2 adapted to be placed across an electrical heater means 12 when the thermostat construction 10 is disposed in the condition illustrated in FIG. 3 in a manner hereinafter set forth and for disconnecting the power source leads L1 and L2 from the electrical heater means 12 and placing the same across another electrical heater means 13 when the thermostat construction 10 is disposed in the condition illustrated in FIG. 4 in a manner hereinafter described.

The thermostat construction 10 comprises a frame means or housing 14 having a chamber 15 therein containing a pair of spaced fixed contacts 16 and 17 respectively interconnected to terminal means 18 and 19 adapted respectively to be interconnected to external leads 20 and 21 in any conventional manner so that the fixed contacts 16 and 17 are respectively electrically interconnected to one side 22 and 23 of the electrical heater means 13 and 12.

The terminal means 19 for the fixed contact 17 can have its right-hand end 24, FIGS. 3 and 4, fastened to the housing means 14 while its left-hand end 25 that carries the fixed contact 17 is free for movement relative to the housing means 14. However, the terminal 19 has a spring bias that normally holds the end 25 flat against the housing in the manner illustrated in FIG. 3. However, a threaded adjusting member 26 is disposed in a threaded bore 27 in the housing 14 to have its end 28 engageable against the free end 25 of the terminal 19 to position the terminal end 25, and, thus, the contact 17 downwardly toward the other fixed contact 16 depending upon the threaded relation between the threaded member 26 and the housing 14 so that the spacing between the contacts 16 and 17 can be adjusted for a purpose hereinafter described.

The other sides 29 and 30 of the electrical heater means 13 and 12 are respectively interconnected by lead means 31 to the power source lead L2.

The other power source lead L1 is interconnected by a lead 32 to a terminal means 33 of the housing 14 in any suitable manner with the terminal means 33 being electrically interconnected to the right-hand end 34 of a conductive switch blade 35 that is fastened thereto by suitable rivet means 36. The switch blade 35 carries contact means 37 on the left-hand free end 38 thereof with the contact means 37 being cooperable with the fixed contacts 16 and 17 in the manner illustrated in FIGS. 3 and 4. However, the natural bias of the spring blade 35 is to move the blade 35 downwardly in the manner illustrated in FIG. 3 to normally place the contact means 37 into good electrical contact with the fixed contact 16 as illustrated.

A bimetallic snap disc of substantially circular configuration 39 is carried by the housing means 14 and has its outer periphery 40 received within a recess 41 formed in the housing means 14 and being held in the recess 41 by a cover member 42 detachably carried by the housing 14 and closing the chamber 15 thereof as illustrated.

A plunger means 43 of this invention comprises a first plunger part 44 having an opening 45 interrupting one flat end 46 thereof to terminate within the part 44 at an end wall 47. The other end 48 of the plunger part 44 is formed with a hemispherical configuration and is adapted to engage against the central part 49 of the snap disc 39 as illustrated.

The plunger part 44 is disposed within a guide opening 50 passing through a guide part 51 secured in the chamber 15 of the housing 14 in any suitable manner to locate and guide the axial up and down movement of the plunger means 43 between the positions illustrated in FIGS. 3 and 4.

The plunger means 43 has another plunger part 52 that is substantially rivet-shaped so as to have a stem 53 thereof received within the opening 45 of the first plunger part 44 and have its free end 54 bottom out against the end wall 47 at the end of the opening 45 of the plunger part 44 as illustrated in FIGS. 3 and 4. The stem 53 of the plunger part 52 passes loosely through an opening 55 formed centrally through the switch blade 35 as illustrated in the drawings so that the stem 53 does not engage the blade 35 but permits axial movement therebetween.

However, the rivet-like part 52 of the plunger means 43 has a hat-shaped head 56 defined by a first disc-like part 57 adjacent the stem 52 and a smaller disc-like part 58 on top of the disc-like part 57 to act as a spring locating means. For example, a compression spring 59 is carried by the housing means 14 and has one end 60 telescopically disposed over the disc part 58 to rest against the lower disc part 57 as illustrated in FIG. 4 and has another end 61 received within an annular recess 62 of a threaded adjusting member 63 threadedly disposed in a threaded bore 64 formed in the housing 14 and leading from the exterior thereof to the chamber 15 as illustrated.

The adjusting member 63 has a knob construction 65 secured thereto or formed integrally therewith, as desired, whereby rotation of the knob 65 varies the threaded relation of the threaded member 63 within the housing 14 and, thus, the force of the compression spring 59 urging the plunger means 43 into engagement with the central part 49 of the snap disc 39. If desired, the knob 65 can have a suitable pointer means 66 extending therefrom to be movable adjacent a scale 67 on the housing 14 as illustrated in FIG. 1 to indicate the temperature setting position of the knob 65 and, thus, the temperature setting of the temperature setting means for the thermostat construction 10. If desired, outwardly extending stops or abutments 68 and 69 can be provided on the housing 14 to limit rotational movement of the knob 65 to the right and left as illustrated in FIG. 1 as the pointer part 66 of the knob 65 will abut against the stops 68 and 69 when at the opposed limits of its temperature setting positions.

Thus, by varying the threaded relation of the threaded member 63 with the housing 14, the force of the compression spring 59 urging the plunger means 43 into engagement with the central part 49 of the snap disc 39 varies the temperature required for the snap disc 39 to snap from the condition illustrated in FIG. 3 to the condition illustrated in FIG. 4 upon the principles fully set forth in the aforementioned patent to Spencer, No. 2,239,540, whereby the theory and operation of the change in the spring force being imposed on the snap disc 39 to change the temperature required to snap the disc 39 over center in either direction need not be further described.

The switch blade 35 is provided with V-shaped, bent projections 70 on both sides of the opening 55 passing therethrough so that the apex portions 71 of the V-shaped projections 70 are adapted to be engaged by the annular shoulder or wall 46 of the plunger part 44 as the plunger part 44 is being moved upwardly from the position illustrated in FIG. 3 to the position illustrated in FIG. 4 whereby the take-up of the lost motion provided between the annular shoulder 46 and the projections 70 of the blade 35 before the plunger part 44 engages the blade 35 causes the plunger part 44 to abruptly engage the switch blade 35 and move the same upwardly from the position illustrated in FIG. 3 to the position illustrated in FIG. 4 as the snap disc 39 is snapping over center so that any contact weld that might exist between the movable contact 37 and the fixed contact 16 will be broken by such lost motion take-up movement of the plunger part 44.

The snap distance of the snap disc 39 is so constructed and arranged that when the disc 39 is fully snapped over center in the manner illustrated in FIG. 4, the plunger part 44 will place and hold the movable contact 37 into contact with the fixed contact 17 in opposition to the force of the normal bias of the spring blade 35 tending to return the movable contact 37 to its down position as illustrated in FIG. 3. However, it can be seen that the other side 72 of the head 56 of the housing part 52 is now spaced from the blade 35 when the blade 35 has been moved to its up position as illustrated in FIG. 4 so that when the snap disc 37 subsequently snaps back over center from the position illustrated in FIG. 4 to the position illustrated in FIG. 3, the plunger means 43 will follow such movement of the disc 39 because of the downward force of the compression spring 59. Thus, because of the spacing between the under surface 72 and the blade 35, any contact welding of the movable contact 37 to the fixed contact 17 will be broken by the under surface 72 of the plunger part 52 abruptly engaging against the blade 35 after the take-up of lost motion therebetween to overcome such welded condition and permit the blade 35 to move downwardly until the movable contact 37 is placed in contact with the contact 16. Such movement of the blade 35 takes place with substantially a snap motion because the compression spring 59 causes the plunger part 52 to follow the snap movement of the disc 39.

Thus, it can be seen that in the operation of the electrical control system 11, when the temperature sensing condition of the snap disc 39 causes the snap disc 39 to be in the position illustrated in FIG. 3, only the heating element 13 is being placed across the power source leads L1 and L2 and is, thus, being operated by the thermostat 10. However, when the temperature being sensed by the snap disc 39 changes in such a manner that the same reaches the temperature for which the control knob 65 has been set, the snap disc 39 snaps over center and through the plunger means 44 in the manner previously described snaps the switch blade 35 from the position illustrated in FIG. 3 to the position illustrated in FIG. 4 whereby the heater means 13 is effectively disconnected from the power source leads L1 and L2 and the heater means 12 is now placed across the power source leads L1 and L2 as illustrated in FIG. 4 to be operated by the thermostat 10. Conversely, when the temperature being sensed by the snap disc 39 returns to the condition that will cause the snap disc 39 to snap back to the position illustrated in FIG. 3, the snap disc 39 snaps back over center from the position illustrated in FIG. 4 to the position illustrated in FIG. 3 to switch the power source leads L1 and L2 from the heater means 12 back to the heater means 13.

Therefore, it can be seen that the thermostat construction 10 of this invention is readily adapted to control a switching operation by the plunger means 43 that serves the dual purpose of setting the operating temperature for the thermostat disc 39 as well as providing opposed abutment means 46 and 72 to move the switch blade 35 between its two positions in a lost motion take-up manner to overcome any welding between the movable contact 37 and the fixed contacts 16 and 17 in the manner as previously set forth.

Further, by having the plunger means 43 pass through the opening 55 in the blade 35, the blade 35 is not utilized in any manner to translate the motion or force of the compression spring 59 to the central part 49 of the snap disc 39 as provided in the aforementioned patent to Spencer, No. 2,239,540, and all of the parts 44, 52, 63 and 65 for the temperature setting means of the thermostat 10 are in direct alignment with each other and with the snap disc 39 to provide for accurate temperature setting control for the snap disc 39.

While the thermostat 10 previously described has been provided with a switching function in both snapped conditions of the snap disc 39, it is to be understood that the various features of this invention can be utilized to merely make or break one switch without including the breaking and making of another switch in combination therewith.

Figure 6:
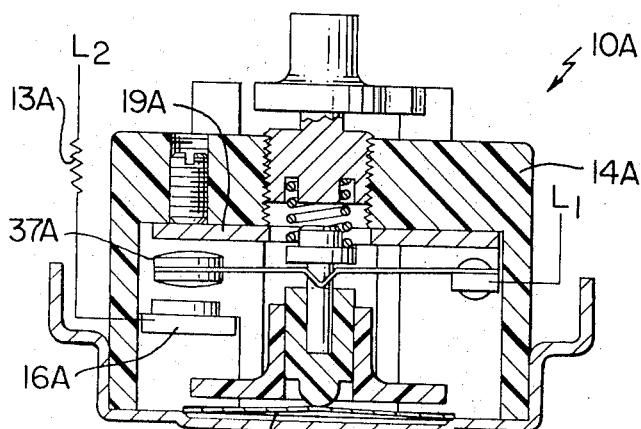
FIG. 6 is a view similar to FIG. 4 and illustrates another embodiment of this invention.

For example, reference is now made to FIG. 6 wherein another thermostat construction of this invention is generally indicated by the reference numeral 10A and parts thereof similar to the thermostat 10 previously described are indicated by like reference numerals followed by the reference letter "A."

As illustrated in FIG. 6, the snap disc 39A is illustrated as having been snapped over center from the normal condition of FIG. 3 to the position of FIG. 4 to thereby move the movable contact 37A away from the fixed contact 16A in the manner previously described. However, because the thermostat construction 10A does not include a fixed contact 17 on the terminal 19A thereof, the snap disc 39A merely maintains the movable contact 37A out of contact with the fixed contact 16A and spaced from the terminal 19A as illustrated in FIG. 6 so that no current is passing through the thermostat construction 10A when the snap disc 39A is in its up position as illustrated in FIG. 6. However, when the shap disc 39A snaps downwardly to place the same in the position illustrated in FIG. 3, it can be seen that the movable contact 37A will be in engagement with the fixed contact 16A so that power source leads L1 and L2 will place the heater means 13A in operation.

Therefore, it can be seen that this invention not only provides an improved thermostat construction having improved temperature setting means therefor, but also this invention provides an electrical control system utilizing such a thermostat construction.

While the form of the invention now preferred has been disclosed as required by the Patent Statute, other forms may be utilized all coming within the scope of the appended claims.

What is claimed is:

1. In a thermostat construction having a fixed contact and a blade-carried movable contact supported by a frame means and bimetallic snap disc carried by said frame means for controlling movement of said movable contact relative to said fixed contact in response to snapped temperature sensing conditions of said disc together with temperature setting means carried by said frame means for selecting the temperature of operation of said disc for moving said movable contact out of contact with said fixed contact, the improvement wherein said blade has opening means passing therethrough and said temperature setting means comprises plunger means passing loosely through said opening means provided through said blade and engaging said snap disc, spring means carried by said frame means and being operatively associated with said plunger means to urge said plunger means into engagement with said snap disc, and means for adjusting the force of said spring means that urges said plunger means into said engagement with said snap disc.

2. In a thermostat construction as set forth in claim 1, the further improvement wherein said plunger means engages said snap disc at the central portion thereof.

3. In a thermostat construction as set forth in claim 1, the further improvement wherein said plunger means has abutment means disposed between said blade and said snap disc for engaging said blade and moving said blade as said snap disc is snapped from one condition thereof to the other condition thereof to move said movable contact out of contact with said fixed contact.

4. In a thermostat construction as set forth in claim 3, the further improvement wherein said blade has a V-shaped portion having the apex thereof engageable with said abutment means.

5. In a thermostat construction as set forth in claim 4, the further improvement wherein said blade has another V-shaped portion having the apex thereof engageable with said abutment means, said V-shaped portions being disposed on opposite sides of said opening means.

6. In a thermostat construction as set forth in claim 3, the further improvement wherein said plunger means has another abutment means spaced from the first-named abutment means and disposed on the other side of said blade for engaging the same.

7. In a thermostat construction as set forth in claim 6, the further improvement wherein said frame means carries another fixed contact spaced from the first named fixed contact and being engaged by said movable contact when said snap disc is snapped from said one condition thereof to said other condition thereof.

8. In a thermostat construction as set forth in claim 7, the further improvement wherein said other abutment means of said plunger means is adapted to engage said blade and move said movable contact thereof out of contact with said other fixed contact when said snap disc is snapped from said other condition thereof to said one condition thereof.

9. In a thermostat construction as set forth in claim 6, the further improvement wherein said plunger means comprises a first part having an opening interrupting one end thereof that defines said first-named abutment means and having the other end thereof engaging said snap disc, a second part being substantially rivet-shaped with the stem thereof passing loosely through said opening means of said blade and bottoming-out in said opening of said first part and with the head thereof defining said other abutment means.

10. In a thermostat construction as set forth in claim 9, the further improvement wherein said spring means comprises a coiled compression spring having one end thereof engaging said head of said second part and being positioned by said head, said means for adjusting the force of said spring means comprising a rotatable member threaded to said frame means and engaging the other end of said coiled compression spring.

11. In an electrical control system having a thermostat construction provided with a fixed contact and a blade carried movable contact supported by a frame means and a bimetallic snap disc carried by said frame means for controlling movement of said movable contact relative to said fixed contact in response to snapped temperature sensing conditions of said disc together with temperature setting means carried by said frame means for selecting the temperature of operation of said disc for moving said movable contact out of contact with said fixed contact, the improvement wherein said blade has opening means passing therethrough and said temperature setting means comprises plunger means passing loosely through said opening means provided through said blade and engaging said snap disc, spring means carried by said frame means and being operatively associated with said plunger means to urge said plunger means into engagement with said snap disc, and means for adjusting the force of said spring means that urges said plunger means into said engagement with said snap disc.

12. In an electrical control system as set forth in claim 11, the further improvement wherein said plunger means engages said snap disc at the central portion thereof.

13. In an electrical control system as set forth in claim 11, the further improvement wherein said plunger means has abutment means disposed between said blade and said snap disc for engaging said blade and moving said blade as said snap disc is snapped from one condition thereof to the other condition thereof to move said movable contact out of contact with said fixed contact.

14. In an electrical control system as set forth in claim 13, the further improvement wherein said blade has a V-shaped portion having the apex thereof engageable with said abutment means.

15. In an electrical control system as set forth in claim 14, the further improvement wherein said blade has another V-shaped portion having the apex thereof engageable with said abutment means, said V-shaped portions being disposed on opposite sides of said opening means.

16. In an electrical control system as set forth in claim 13, the further improvement wherein said plunger means has another abutment means spaced from the first-named abutment means and disposed on the other side of said blade for engaging the same.

17. In an electrical control system as set forth in claim 16, the further improvement wherein said frame means carries another fixed contact spaced from the first named fixed contact and being engaged by said movable contact when said snap disc is snapped from said one condition thereof to said other condition thereof.

18. In an electrical control system as set forth in claim 17, the further improvement wherein said other abutment means of said plunger means is adapted to engage said blade and move said movable contact thereof out of contact with said other fixed contact when said snap disc is snapped from said other condition thereof to said one condition thereof.

19. In an electrical control system as set forth in claim 16, the further improvement wherein said plunger means comprises a first part having an opening interrupting one end thereof that defines said first-named abutment means and having the other end thereof engaging said snap disc, a second part being substantially rivet-shaped with the stem thereof passing loosely through said opening means of said blade and bottoming-out in said opening of said first part and with the head thereof defining said other abutment means.

20. In an electrical control system as set forth in claim 19, the further improvement wherein said spring means comprises a coiled compression spring having one end thereof engaging said head of said second part and being positioned by said head, said means for adjusting the force of said spring means comprising a rotatable member threaded to said frame means and engaging the other end of said coiled compression spring.

21. In a thermostat construction having a first contact and a blade-carried second contact supported by a frame means and a bimetallic snap member carried by said frame means for controlling movement of said second contact relative to said first contact in response to snapped temperature sensing conditions of said member together with temperature setting means carried by said frame means for selecting the temperature of operation of said member for moving said second contact out of contact with said first contact, the improvement wherein said blade has opening means passing therethrough and said temperature setting means comprises plunger means passing loosely through said opening means provided through said blade and engaging said snap member, spring means carried by said frame means and being operatively associated with said plunger means to urge said plunger means into engagement with said snap member, and means for adjusting the force of said spring means that urges said plunger means into said engagement with said snap member.

22. In an electrical control system having a thermostat construction provided with a first contact and a blade carried second contact supported by a frame means and a bimetallic snap member carried by said frame means for controlling movement of said second contact relative to said first contact in response to snapped temperature sensing conditions of said member together with temperature setting means carried by said frame means for selecting the temperature of operation of said member for moving said second contact out of contact with said first contact, the improvement wherein said blade has opening means passing therethrough and said temperature setting means comprises plunger means passing loosely through said opening means provided through said blade and engaging said snap member, spring means carried by said frame means and being operatively associated with said plunger means to urge said plunger means into engagement with said snap member, and means for adjusting the force of said spring means that urges said plunger means into said engagement with said snap member.

* * * * *